Dec. 5, 1967     J. M. JOHNSON     3,356,085
FOOD WARMER

Filed Oct. 23, 1965     2 Sheets-Sheet 1

James M. Johnson,
Inventor,
Koenig, Senniger, Powers and Leavitt,
Attorneys.

Dec. 5, 1967   J. M. JOHNSON   3,356,085
FOOD WARMER
Filed Oct. 23, 1965   2 Sheets-Sheet 2
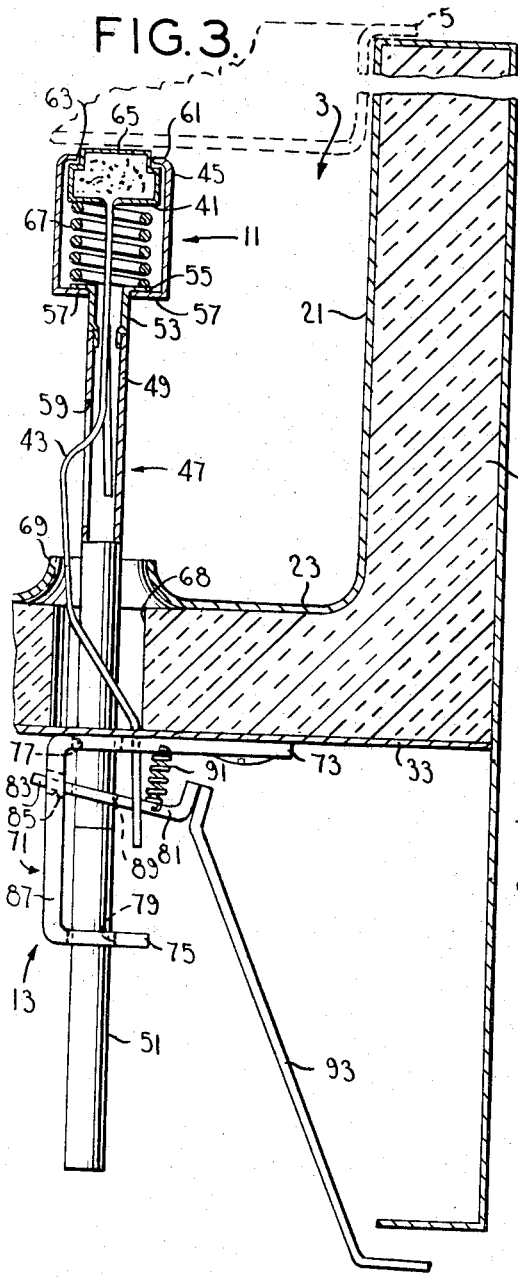
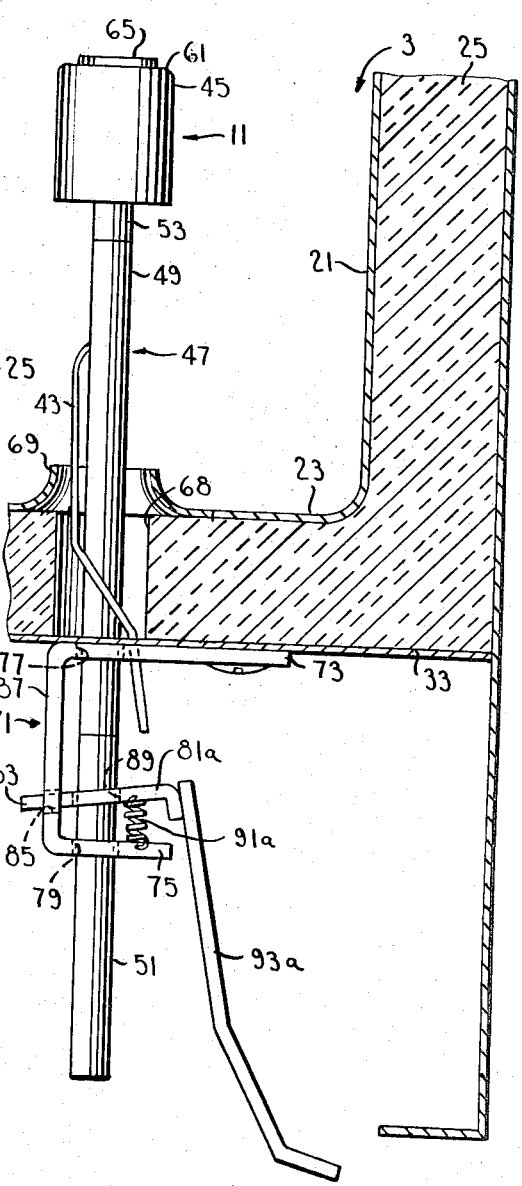
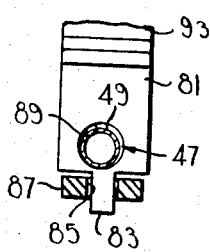
FIG. 4.

United States Patent Office 3,356,085
Patented Dec. 5, 1967

3,356,085
FOOD WARMER
James M. Johnson, Ladue, Mo., assignor to Duke Manufacturing Co., St. Louis, Mo., a corporation of Missouri
Filed Oct. 23, 1965, Ser. No. 503,851
11 Claims. (Cl. 126—37)

ABSTRACT OF THE DISCLOSURE

A food warmer comprises a compartment having several openings at the top for the reception of pans which hold food to be warmed and maintained at a given temperature. Pans of various depths may be inserted into each compartment through the openings. Heaters below the compartment are each individually controlled by an associated contact type heat-sensing element which is adapted to contact the bottom of a pan in the compartment. Each element is carried by a separate holder beneath a pan and projects from the top of its holder for contact with the bottom of the pan. Each holder extends through an opening in the bottom of the compartment and is adjustable up and down throughout a range of positions sufficient for placing its respective element in contact with the bottom of a pan thereabove in the compartment. Each holder is held in any of its adjusted positions by a latch which prevents movement in one direction but allows substantially free movement of the holder in the opposite direction by exerting slight pressure on the holder so that the latch does not need to be disengaged for adjustment of the holder in the latter direction.

Among the several objects of the invention may be noted the provision of an improved thermostatic control for a food warmer which accurately regulates the temperature of food in a pan by sensing the temperature of the pin by heat-exchange contact therewith; the provision of such a control which may be adjusted for contacting pans of various depths; the provision of such a control having thermostatic means which may be adjusted into contact with a pan after the pan is in place in the food warmer; the provision of such a control as to which the thermostatic means may be contacted and lowered by the pan or the pan is lowered into the warmer; and the provision of such a control which may be conveniently adjusted to the desired location and firmly held in the adjusted position. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view in plan of a food warmer of the invention omitting pans which are placed in the warmer;

FIG. 3 is an enlarged fragmentary section taken on line 3—3 of FIG. 1 showing a latching mechanism, with certain parts being broken away to show detail;

FIG. 4 is a detail section showing a portion of the FIG. 3 latching mechanism; and FIG. 5 is a section similar to FIG. 3 showing an alternative embodiment.

Corresponding reference characters indicate corresponding parts throughout the several views of the drawings.

Figure 1:
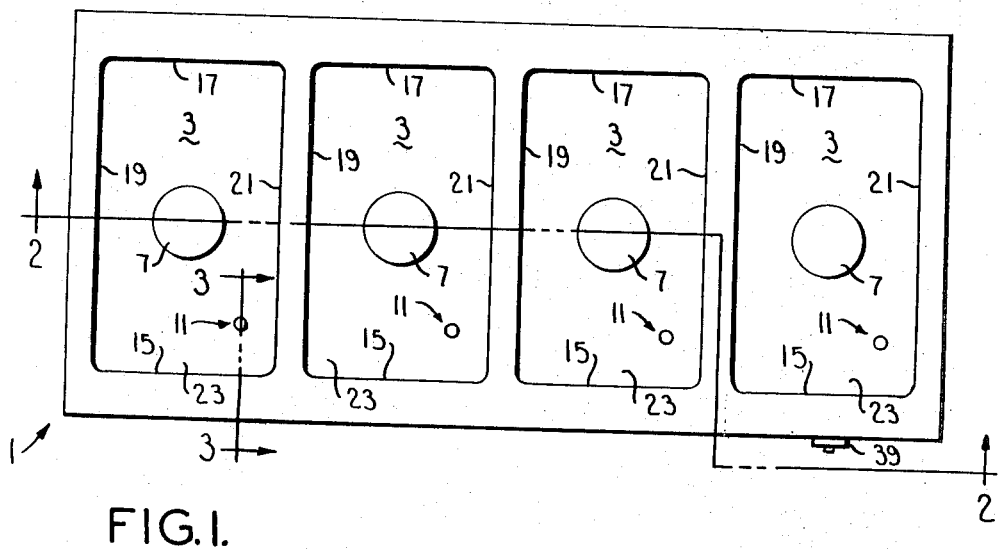

Referring to the drawings, a food warmer of this invention is shown to comprise a body generally designated 1 constituted by a cabinet structure on legs. The body 1 is formed to provide at its top a plurality of compartments 3 which are open at the top for reception of pans 5. Pans 5 are inset in compartments 3 and may be of various depths, such as 2½ inches, 4 inches and 6 inches deep, for example. Pans 5 are adapted to hold food to be warmed and maintained at a given temperature, as for restaurant and cafeteria service. At the bottom of each compartment 3, there is a radiation plate 7 which is heated by a heater 9 immediately beneath it in body 1. Each heater 9 is individually controlled by a separate contact-type thermostatic means generally designated 11 (FIGS. 1 and 3) which contacts the bottom of the respective pan 5 to sense its temperature and control the heater directly in response to the temperature of the pan. Since pans of various depth may be used as shown in FIG. 2, the thermostatic means 11 is supported for up and down movement by mounting means generally designated 13 which permits the thermostatic means to be adjusted into contact with the bottom of a pan of any suitable depth received in the compartments and to be held in heat-exchange contact with the bottom of the pin.

More particularly, each compartment 3 is shown as rectangular in plan, having a front wall 15, a back wall 17, sides 19 and 21 and a bottom 23. Thermal insulation indicated at 25 is provided at the front, back, sides and bottom of each compartment 3 to thermally isolate the compartment 3, there is a radiation plate 7 which is of corresponding rectangular shape, have outwardly projecting rims 27 at their upper edges which rest on the top of body 1 around the periphery of compartments 3.

Figure 2:
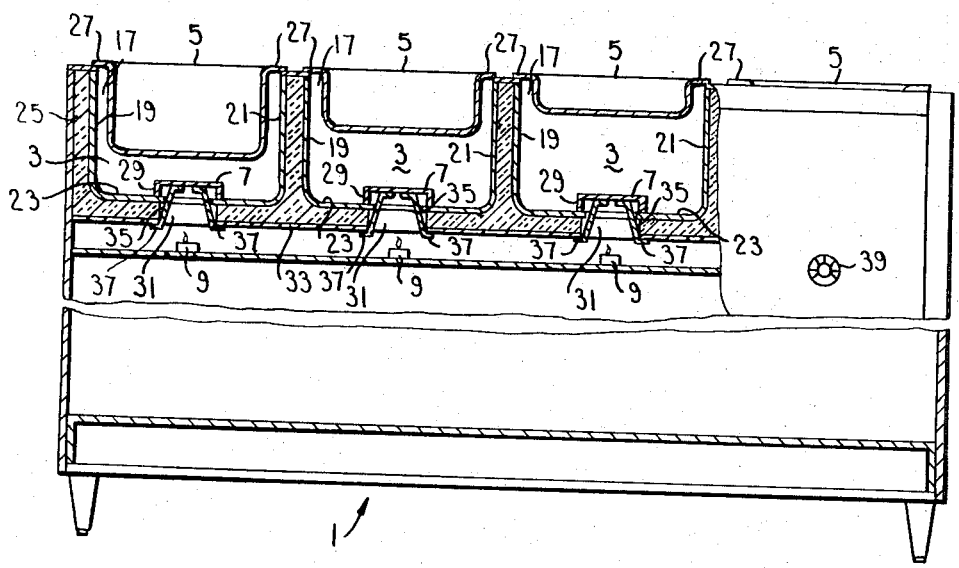
FIG. 2 is a fragmentary section taken on line 2—2 of FIG. 1 and showing pans inset in the warmer.

Referring now to FIG. 2, each radiation plate 7 is shown to have a downwardly extending skirt 29 which bears on the bottom 23 of the compartment around an opening 31 therein, this opening continuing through insulation 25 and through an insulation-retaining horizontal plate 33 of the body 1. Spring clips 35 extend down from plates 7 through openings 31 and have fingers 37 at their lower ends which clip under plate 33. The radiation plate 7 may be installed or removed through compartment 3 by flexing the clips 35 inwardly until the fingers 37 will pass through holes 31. The compartments are of such depth that even the deepest pan 5 (shown at the left in FIG. 2) is spaced above the radiation plate 7 so that substantially even heating across the bottom of the pans may be obtained.

The heaters 9 are shown in the drawings as gas burners and they are controlled by conventional regulator valves (not shown) so that the temperature may be maintained at the desired value. One of the knobs for one of these regulator valves is indicated at 39 in FIGS. 1 and 2. While a gas heating system has been shown and described, it will be understood that electrical heating units are available and may be used for the heating means.

The thermostatic means 11 illustrated in FIGS. 3 and 5 of the drawings comprises a heat-sensing element 41 illustrated as a fluid-filled temperature- responsive bulb, the bulb communicating through a capillary tube 43 with the regulator for one of the gas burners 9. It will be understood that the temperature sensed by the bulb 41 controls the regulator for the respective burner 9 which determines the amount of heat provided to compartments 3. At 45 is indicated a holder for the bulb in the form of a cylindric cup. This cup 45 is mounted at the upper end of a stem generally designated 47. Stem 47 has an upper tubular section 49 and a lower solid cylindric rod section 51. The tubular section 49 of the stem has a tubular fitting 53 at its upper end which extends into the cup through its bottom. The fitting 53 has a flange 55 at its upper end engageable by tangs 57 which extend radially inward from the wall of the cup at its lower end to limit upward sliding movement of the cup on the stem. The capillary tube 43 extends down from the bulb through the fitting and tubular section 49 and out through a slot 59 in the wall of the latter. The cup 45 has an inturned rim 61 at its upper end bounding an opening 63. The bulb 41 has a reduced-diameter upper end portion 65 having a loose sliding fit in this opening. A coil compression spring 67 reacts from flange 55 of fitting 53 against the bottom of the bulb to bias it to a fully extended position wherein its upper end portion 65 extends out of the upper end of the cup determined by engagement of the shoulder on the bulb at the base of portion 65 with the rim 61 of the cup. The stem 47 extends loosely through an opening 68 in the bottom 23 of the compartment 3, this opening continuing through insulation 25 and plate 33. Bottom 23 is bossed upward around opening 68 as indicated at 69 to prevent any spillage from pan 5 running down through the opening.

The mounting 13, as shown in FIGS. 3 and 4, comprises a generally C-shaped bracket 71 having upper and lower arms 73 and 75 formed with aligned holes 77 and 79, respectively, for slidably receiving stem 47. The upper arm 73 is secured to the bottom of plate 33 with the holes 77 and 79 aligned with opening 68 for the stem. A latch plate 81 is pivoted on bracket 71 by having a tang 83 loosely received in a hole 85 in the vertical leg 87 of the bracket. Latch plate 81 has a hole 89 therethrough which is somewhat larger than the stem 47 and generally aligned with holes 77 and 79 in the arms of the bracket. Stem 47 extends through holes 77, 89 and 79 as shown in FIG. 3. A compression spring 91 reacts from the bottom of the upper bracket arm 73 against the top of latch plate 81 to bias the latch plate to swing downward to the latching position shown in FIG. 3 wherein it binds stem 47 for latching the stem in adjusted position. When latch plate 81 is in its downwardly angled FIG. 3 latching position, any downward movement of the stem causes the latch plate to bind the stem even tighter. The stem, however, is free to move upwardly since upward movement of the stem has the effect of swinging plate 81 upward to release the stem.

A handle 93 is attached to latch plate 81 and angles downward and forward therefrom to have its lower end in a position conveniently accessible from the front of the warmer body 1 for manipulation to release the latch plate to enable vertical adjustment of the stem and the thermostatic means 11 at the upper end of the stem.

The bulb 41 may be adjusted into contact with the bottom of a pan 5, utilizing the latching structure of FIG. 3, by first lifting up on the handle 93 and pushing downwardly on the cup-stem assembly 41, 47 to lower it to a position where it will be substantially below the bottom of a pan 5 to be inserted in a compartment 3. When handle 93 is released it is returned by spring 91 to its FIG. 3 position. The pan is inset in the compartment, and the bulb 41 placed in contact with the bottom of the pan by pushing stem 47 to the point where the bulb firmly contacts the bottom of pan 5 as illustrated in FIG. 3. Pan 5 may be held down to prevent the thermostatic means from tilting the pan. If pan 5 is then replaced by a shallower pan, the bulb 41 may be simply moved upwardly into contact with the bottom of the pan without requiring movement of handle 93 although it will be understood that the handle 93 can be lifted if desired to facilitate upward movement of the stem and the bulb. By placing the bulb directly in contact with the bottom of the pan 5, the heating means is controlled directly in response to the temperature of the food in the pan, not by the ambient air surrounding the pan within the compartments 3, as is desirable.

FIG. 5 illustrates a modified version of the latching mechanism for the stem 47 in which the latch plate, designated 81a, is biased to swing upward instead of downward as in FIG. 3. The latch spring, designated 91a in FIG. 5, reacts upward from the lower arm 75 of bracket 71 (instead of downward from the upper arm 77).

The handle, designated 93a in FIG. 5, is modified to facilitate pushing it in instead of lifting its outer end up as in FIG. 3. With the FIG. 5 embodiment, the cup-stem assembly 45, 47 may be pushed down without manipulating the latch handle 93a, and the latter needs to be pushed in to swing the latch plate 81a down in order to push the stem upward for contact of bulb 41 with the bottom of a pan.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreated as illustrative and not in a limiting sense.

What is claimed is:

1. A food warmer comprising
   a body formed with at least one compartment open at the top for reception of one of pans of different depth with the pan inset in the compartment,
   means below said compartment for heating the compartment,
   and thermostatic means for controlling said heating means comprising
   a heat-sensing element adapted to contact the bottom of a pan,
   a holder for said element
   and means mounting said holder for up and down movement in said compartment for adjustment of said holder throughout a range sufficient for placing said element in contact with the bottom of any pan received in the compartment, and means independent of the pan for maintaining said holder in adjusted position with said element in contact with the bottom of the pan.

2. A food warmer as set forth in claim 1 wherein the holder extends through an opening in the bottom of the compartment, the holder having an opening at the top thereof, the heat-sensing element is carried by the holder and is adapted to project through said opening in the holder, and the warmer further comprising means carried by the holder for yieldably mounting the element projecting through said opening at the top of the holder.

3. A food warmer comprising
   a body formed with at least one compartment open at the top for reception of a pan with the pan inset in the compartment,
   means below said compartment for heating the compartment,
   and thermostatic means for controlling said heating means comprising
   a heat-sensing element adapted to contact the bottom of a pan,
   said element being mounted on the upper end of a holder mounted for vertical adjustment extending through an opening in the bottom of the compartment,
   and latch means mounted underneath said compartment and cooperable with said holder for latching the holder in adjusted position with the sensing element contacting the bottom of a pan received in the compartment.

4. A food warmer comprising
   a body formed with at least one compartment open at the top for reception of a pan with the pan inset in the compartment,
   means below said compartment for heating the compartment,
   thermostatic means for controlling said heating means, the thermostatic means comprising a heat-sensing element for sensing the temperature of the bottom of a pan in the compartment,
   a bracket secured to the bottom of the compartment,
   a holder having an elongate stem portion projecting through the compartment bottom and through the bracket, means for latching the stem to the bracket at various positions of adjustment, the holder having a housing for the heat-sensing element, the housing being located in the compartment and being open at its upper end, and the heat-sensing element projecting through an opening in the housing for engagement with the bottom of a pan in the compartment whereby the housing may be adjusted in the compartment for placing the heat-sensing element of the thermostatic means in contact with the bottom of a pan in the compartment.

5. A food warmer as set forth in claim 4 wherein the latching means is biased into latching engagement with the stem to prevent movement of the stem in one direction only.

6. A food warmer comprising a body formed with at least one compartment open at the top for reception of a pan with the pan inset in the compartment, said compartment having a front, a back, sides and a bottom, said bottom having a hole through it, a bracket secured to the bottom of the compartment and having two spaced arms with holes therethrough aligned with each other and with the hole in the compartment bottom, a latch plate pivoted to the bracket between the bracket arms and having a hole through it which may be aligned with the bracket arm holes, means below said compartment for heating the compartment, and thermostatic means for controlling said heating means comprising a heat-sensing element, a holder for the heat-sensing element having a stem portion projecting through the hole in the compartment bottom, through the holes in the arms of the bracket, and through the hole in the latch plate with the latch plate being angularly movable relative to the bracket arms and the stem between a clamping position in engagement with the stem for holding the stem against axial movement in one direction relative to the bracket at various positions of adjustment and a released position where free axial movement of the stem in either axial direction between its various positions of adjustment is permitted, the holder having a housing in the compartment open at its upper end, and the heat sensing element projecting through the open end of the housing for engagement with the bottom of a pan in the compartment whereby the housing may be adjusted in the compartment until the heat sensing element of the thermostatic means may contact the bottom of a pan in the compartment.

7. A food warmer as set forth in claim 6 wherein the latch plate is spring biased into its clamping position.

8. A food warmer as set forth in claim 6 wherein the latch plate is inclined relative to the axis of the stem when it is in its latching position in engagement with the stem, the plate being substantially perpendicular to the axis of the stem when it is in its released position.

9. A food warmer as set forth in claim 6 further comprising a spring reacting from the bracket against the latch plate for biasing the latch plate into its clamping position, and the latch plate when in the clamping position being inclined to the axis of the stem for binding engagement with the stem for holding it against movement in one direction relative to the bracket, and said plate being movable against said spring toward its released position when the stem is urged in the other direction relative to said bracket whereby movement of the stem is permitted in said other direction without releasing said latch plate.

10. A food warmer as set forth in claim 9 wherein the spring biases the latch plate downwardly from its pivoted connection to the bracket whereby downward movement of the stem is prevented until the latch plate is moved to its released position.

11. A food warmer as set forth in claim 9 wherein the spring biases the latch plate upwardly from its pivoted connection to the bracket whereby upward movement of the stem is prevented until the latch plate is moved to its released position.

References Cited

UNITED STATES PATENTS

| | | | |
|---|---|---|---|
| 2,679,841 | 6/1954 | Muckler | 126—33 |
| 2,749,426 | 6/1956 | Schwaneke | 219—435 X |
| 2,848,894 | 8/1958 | Pappas | 236—32 X |
| 2,862,667 | 12/1958 | Hillebrand. | |
| 2,880,614 | 4/1959 | Reiter | 236—32 X |

CHARLES J. MYHRE, *Primary Examiner.*